(12) United States Patent
Rearden et al.

(10) Patent No.: US 12,274,217 B2
(45) Date of Patent: Apr. 15, 2025

(54) MODULAR ENVIRONMENTAL CONTROL SYSTEMS AND METHODS FOR ENCLOSED STRUCTURES

(71) Applicant: BioTherm Hydronic, Inc., Cotati, CA (US)

(72) Inventors: Jim Rearden, Petaluma, CA (US); Thaddius Humphrey, Santa Rosa, CA (US); Daniel Whittemore, Sebastopol, CA (US); Michael Muchow, Santa Rosa, CA (US)

(73) Assignee: BioTherm Hydronic, Inc., Cotati, CA (US)

( * ) Notice: Subject to any disclaimer, the term of this patent is extended or adjusted under 35 U.S.C. 154(b) by 386 days.

(21) Appl. No.: 17/702,711

(22) Filed: Mar. 23, 2022

(65) Prior Publication Data

US 2022/0304251 A1    Sep. 29, 2022

Related U.S. Application Data

(60) Provisional application No. 63/182,675, filed on Apr. 30, 2021, provisional application No. 63/165,488, filed on Mar. 24, 2021.

(51) Int. Cl.
*A01G 9/24* (2006.01)

(52) U.S. Cl.
CPC .................. *A01G 9/246* (2013.01)

(58) Field of Classification Search
CPC .............. A01G 9/246; F24F 2221/36
See application file for complete search history.

(56) References Cited

U.S. PATENT DOCUMENTS

| | | | |
|---|---|---|---|
| 2,746,826 A * | 5/1956 | Cahn | F24F 13/20 62/262 |
| 3,348,922 A | 10/1967 | Bose et al. | |
| 3,807,088 A | 4/1974 | Jones | |
| 3,949,522 A | 4/1976 | Kehl et al. | |

(Continued)

FOREIGN PATENT DOCUMENTS

| | | | |
|---|---|---|---|
| JP | 2015006133 A | * | 1/2015 |
| KR | 20160013771 A | * | 2/2016 |

*Primary Examiner* — Jorge A Pereiro
*Assistant Examiner* — Michael James Giordano
(74) *Attorney, Agent, or Firm* — Derek J. Westberg, Esq.

(57) ABSTRACT

Modular environmental control systems and methods for enclosed structures are described. In an embodiment, a first air chamber having one or more first openings receives air from an enclosed structure. The first air chamber includes one or more second openings configured to receive ambient air. The one or more second openings are selectively closable. A first duct delivers air from the enclosed structure to the first chamber via the one or more first openings in the first air chamber. A second air chamber receives air from the first air chamber and has one or more openings configured to deliver air to the enclosed structure. A plurality of air conditioning modules are removably mounted to a divider positioned between the first air chamber and second air chamber. Air from the first chamber is selectively received into the second chamber by passing through the air conditioning modules. A second duct is configured to deliver air from the one or more openings of the second chamber to the enclosed structure.

31 Claims, 14 Drawing Sheets

(56) References Cited

U.S. PATENT DOCUMENTS

| | | | |
|---|---|---|---|
| 4,163,342 A | 8/1979 | Fogg et al. | |
| 4,196,544 A | 4/1980 | Davis et al. | |
| 4,292,762 A | 10/1981 | Fogg et al. | |
| 4,567,732 A | 2/1986 | Landstrom et al. | |
| 4,916,642 A | 4/1990 | Kaiser et al. | |
| 5,001,859 A | 3/1991 | Sprung | |
| 5,279,609 A | 1/1994 | Meckler | |
| 5,553,417 A | 9/1996 | Chambers | |
| 5,960,638 A | 10/1999 | McCabe et al. | |
| 7,228,657 B2 | 6/2007 | Brault et al. | |
| 7,258,606 B1 * | 8/2007 | Reid | F24F 1/027 62/262 |
| 8,151,517 B2 | 4/2012 | Emoto | |
| 8,707,617 B2 | 4/2014 | Houweling | |
| 8,857,202 B1 | 10/2014 | Meissner | |
| 9,730,397 B2 | 8/2017 | Houweling et al. | |
| 9,873,310 B2 | 1/2018 | Forejt et al. | |
| 9,907,236 B2 | 3/2018 | Kamp | |
| 10,479,510 B2 | 11/2019 | Borumand et al. | |
| 2004/0194371 A1 * | 10/2004 | Kinnis | A01G 9/246 47/17 |
| 2005/0005510 A1 | 1/2005 | Brault et al. | |
| 2006/0052048 A1 | 3/2006 | Poirier | |
| 2006/0059772 A1 | 3/2006 | Brault et al. | |
| 2010/0300650 A1 * | 12/2010 | Bean, Jr. | H05K 7/20745 165/104.31 |
| 2011/0265974 A1 | 11/2011 | Maxwell | |
| 2016/0157440 A1 | 6/2016 | Looije et al. | |
| 2017/0099785 A1 | 4/2017 | Zimmerman et al. | |
| 2017/0196125 A1 | 7/2017 | Crosby, Jr. et al. | |
| 2018/0020626 A1 | 1/2018 | Kellogg et al. | |
| 2018/0116131 A1 | 5/2018 | Leo | |
| 2018/0271031 A1 | 9/2018 | Houweling | |
| 2019/0150376 A1 * | 5/2019 | Spaans | A01G 9/246 |
| 2019/0246573 A1 | 8/2019 | Ruiz | |
| 2019/0380284 A1 | 12/2019 | Kee | |
| 2020/0039653 A1 | 2/2020 | Borumand et al. | |

* cited by examiner

STAGE 1 FRESH AIR COOL (NO EVAP WATER)

MODULAR ENVIRONMENTAL CONTROL SYSTEMS AND METHODS FOR ENCLOSED STRUCTURES

This application claims priority of U.S. Provisional Application No. 63/165,488, filed Mar. 24, 2021, and U.S. Provisional Application No. 63/182,675, filed Apr. 30, 2021, the entire contents of which are hereby incorporated by reference.

BACKGROUND OF THE INVENTION

The present invention relates to the field of environmental control systems and methods. More particularly, the present invention relates to environmental control systems and methods for enclosed structures such as greenhouses.

Commercial crop production is becoming increasingly reliant on the use of enclosed structures, particularly greenhouses. This is because indoor farming tends to provide myriad advantages over outdoor farming. For example, the use of greenhouses allows crops to be produced in climate zones that are otherwise too cold, too hot, or too dry for certain crops and in areas with poor soil conditions. By reducing dependency on climate and soil conditions, crops can be grown closer to consumers, thereby reducing transportation costs and spoilage. And, even in favorable climates, the use of greenhouses can prolong growing seasons, thereby increasing seasonal crop production yields. Greenhouses also allow for greater control over aspects of the indoor environment, such as temperature and humidity. Greenhouses can also aid the exclusion and control of insects and other crop-destroying pests, thereby reducing the need for insecticides and other pest control measures. Greenhouses can also reduce water consumption by reducing evaporation loss and water seepage into the ground. The many advantages of indoor farming are accompanied by some disadvantages which tend to include increased costs and effort associated with construction and maintenance of greenhouse structures as well as costs and effort associated with controlling and maintaining the indoor environment.

Therefore, what are needed are improved environmental control systems and methods for enclosed structures such as greenhouses.

SUMMARY OF THE INVENTION

The present invention provides modular environmental control systems and methods for enclosed structures. In accordance with an embodiment, a modular environmental control system for an enclosed structure is provided. A first air chamber having one or more first openings is configured to receive air from an enclosed structure. The first air chamber includes one or more second openings configured to receive ambient air. The one or more second openings are selectively closable. A first duct is configured to deliver air from the enclosed structure to the first chamber via the one or more first openings in the first air chamber. A second air chamber is coupled to receive air from the first air chamber and has one or more openings configured to deliver air to the enclosed structure. A divider is positioned between the first air chamber and second air chamber. The divider is configured to removably mount a plurality of air conditioning modules. Air from the first chamber is selectively received into the second chamber by passing through the air conditioning modules. A second duct is configured to deliver air from the one or more openings of the second chamber to the enclosed structure.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

Figure 1:
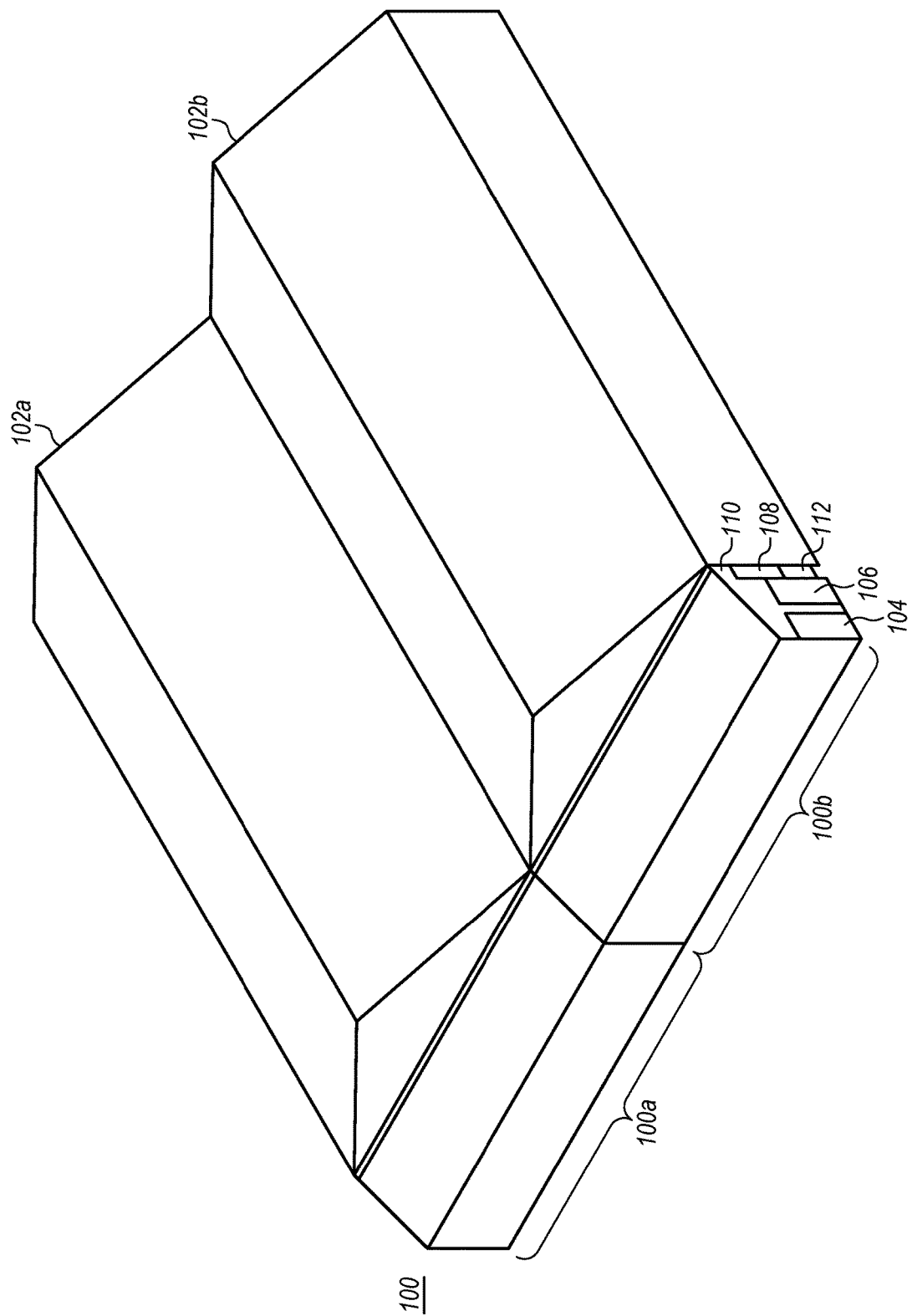
FIG. 1 illustrates a modular environmental control system along with enclosed structures in accordance with an embodiment of the present invention.

The present invention provides modular environmental control systems and methods for enclosed structures, such as greenhouses. The inventive environmental control system is modular and expandable at a system level which means that the system itself is readily expandable in size and capacity, e.g., by increasing a number of system modules. This allows the system to be adapted for different sizes and numbers of enclosed structures. For example, a system can be initially configured to provide environmental control for a single greenhouse. However, over time, the operator or farmer may decide to expand the size of the greenhouse or to add additional greenhouses. The initially-configured system may then be expanded to accommodate the expanded size of the greenhouse or additional greenhouses, e.g., by adding system modules, while re-using or replacing the original system module(s) and components. Thus, a system having an initial capacity can be expanded (or contracted) in size and capacity any number of times. In this way, the system is cost-efficient because an initial investment in a smaller-sized or smaller capacity system continues to be usable while the overall size and/or capacity of the system can be expanded. Cost efficiency is also enhanced due to a single system module design being expandable by adding modules. Another advantage of the inventive system is that a supplier of such system modules does not need to inventory systems of different sizes and capacities.

Moreover, the inventive environmental control system is preferably modular and expandable at a subsystem level (i.e. at the level of system module components). This means that each system module incorporates modular and expandable components, which allows each system module to be adapted (and possibly also re-adapted) for particular capacity requirements. For example, a system module may be initially deployed for controlling the indoor environment of a greenhouse which is used to grow a certain type of crop where the crop has particular temperature or humidity requirements. The system module can therefore be configured with heating, cooling and humidity controlling components that are suitable for that particular crop and climate. However, the farmer may then determine that it may be more advantageous to grow a different crop, having different and potentially more demanding temperature or humidity requirements. In this case, the system module can be readily reconfigured to accommodate these more demanding requirements by increasing the number of heating, cooling and humidity controlling components incorporated in the system (e.g., by adding such components to the system module) while, in some circumstances, retaining and continuing to use at least some of the original heating, cooling and humidity controlling components or, in other circumstances, replacing some such components. Similarly, the capacity requirements for the system modules may be reduced, as needed, by removing or disabling appropriate subsystem components. Components that are removed from a system module can potentially be re-deployed in one or more other system modules, thereby achieving greater configuration flexibility and cost efficiency.

A deployed environmental control system can include multiple system modules, each of which may be particularly configured. In other words, one or more system modules for a system deployment can be configured differently from one or more other modules in the same system deployment. This can be advantageous, for example, where different greenhouses at the same location are used for growing different crops though these different greenhouses may share some resources such as common sources of water, electricity, natural gas and/or carbon dioxide ($CO_2$) gas.

While the inventive environmental control system is described herein primarily in the context of greenhouses, it will be apparent that the inventive environmental control system could be used in other contexts. Such other contexts can include, for example, housing, office buildings or office parks, and industrial structures such as structures for manufacturing, warehousing or livestock farming.

FIG. 1 illustrates a modular environmental control system 100 along with enclosed structures 102a and 102b in accordance with an embodiment of the present invention. As shown in FIG. 1, the environmental control system 100 comprises two environmental control system modules 100a and 100b. The modules 100a and 100b are preferably, though not necessarily, coupled together so that they can share common resources such as water, electricity, natural gas or carbon dioxide ($CO_2$) gas. As is also shown in FIG. 1, each module 100a and 100b is coupled to a corresponding enclosed structure 102a and 102b. The enclosed structures 102a and 102b are each preferably equipped with closable air vents (e.g., located in the roof and/or walls of the enclosed structures 102a and 102b) which allow air to pass between the ambient environment and the structures 102a and 102b. The enclosed structures 102a and 102b can be, for example, greenhouses. The enclosed structures 102a and 102b can be of another type of structure, such as a warehouse or livestock building.

The enclosed structures 102a and 102b can be located close together, or even touching one another, or they may share a common wall. However, the enclosed structures 102a and 102b are preferably substantially environmentally isolated from each other which can be primarily accomplished by preventing air flow between them. For example, in the case of a shared common wall, there may be doorways in the common wall that allow personnel to pass directly from the interior of one of the structures to the other, however, these doorways are also preferably equipped with closeable doors which impede air flowing between the structures 102a and 102b. In some embodiments, however, it may be desirable to permit airflow between structures 102a and 102b, for example, to equalize temperature or humidity.

As shown in FIG. 1, the environmental control system module 100b can include access openings 104 and 106 that are sized sufficiently to allow personnel to enter and exit the environmental control system module 100b. For example, personnel may enter to perform system installation, maintenance and configuration activities. These openings 104 and 106 are preferably equipped with closable doors that can be closed to maintain the interior of the environmental control system module 100b isolated from the ambient. In an embodiment, each of the environmental control system modules 100a and 100b is equipped with such access openings and closable doors. For example, the system module 100a may include openings which are essentially identical to the openings 104 and 106 but which are located at the opposite end of the system module 100a such that these openings are not visible in FIG. 1. The system modules 100a and 100b may also be equipped with similar access opening and closable doors at a junction between the modules 100a and 100b such that personnel may pass directly from the interior of one module to the interior of another.

Also shown in FIG. 1, is a void or space 108 which may be provided between the environmental control system modules 100a and 100b and an end-wall of the enclosed structures 102a and 102b. Thus, the environmental control system modules 100a and 100b are preferably spaced apart from the end-walls of the enclosed structures 102a and 102b. Air that passes from the enclosed structures 102a and 102b and into the environmental control system modules 100a and 100b (also referred herein as "greenhouse" air) may pass through a duct or plenum 110 which is positioned between each of the enclosed structures 102a and 102b and a corresponding environmental control system module 100a and 100b. Air that passes from the environmental control system modules 100a and 100b and into the enclosed structures 102a and 102b (also referred herein as "treated" air) may pass through a duct or plenum 112 which is also positioned between each of the enclosed structures 102a and 102b and a corresponding environmental control system module 100a and 100b.

While the environmental control system modules 100a and 100b may share common resources, they are preferably substantially environmentally isolated from each other which can be primarily accomplished by preventing air flow between them. By maintaining the enclosed structures 102a and 102b environmentally isolated from each other and by maintaining the system modules 102a and 100b environmentally isolated from each other, the enclosed structures 102a and 102b can be controlled so as to maintain environments and perform air treatments that are different from each other. For example, one of the enclosed structures, e.g., the structure 102a, can be maintained at a different temperature or humidity than the other structure, e.g., the structure 102b. As another example, one of the enclosed structures may be subjected to $CO_2$ gas disbursement while the other enclosed structure is not.

As shown in FIG. 1, there are two system modules 100a and 100b and two enclosed structures 102a and 102b and a one-to-one correspondence of system modules to enclosed structures. However, this is not necessary. For example, there can be more or fewer system modules, more or fewer enclosed structures, and there need not be a one-to-one correspondence between them.

Figure 2:
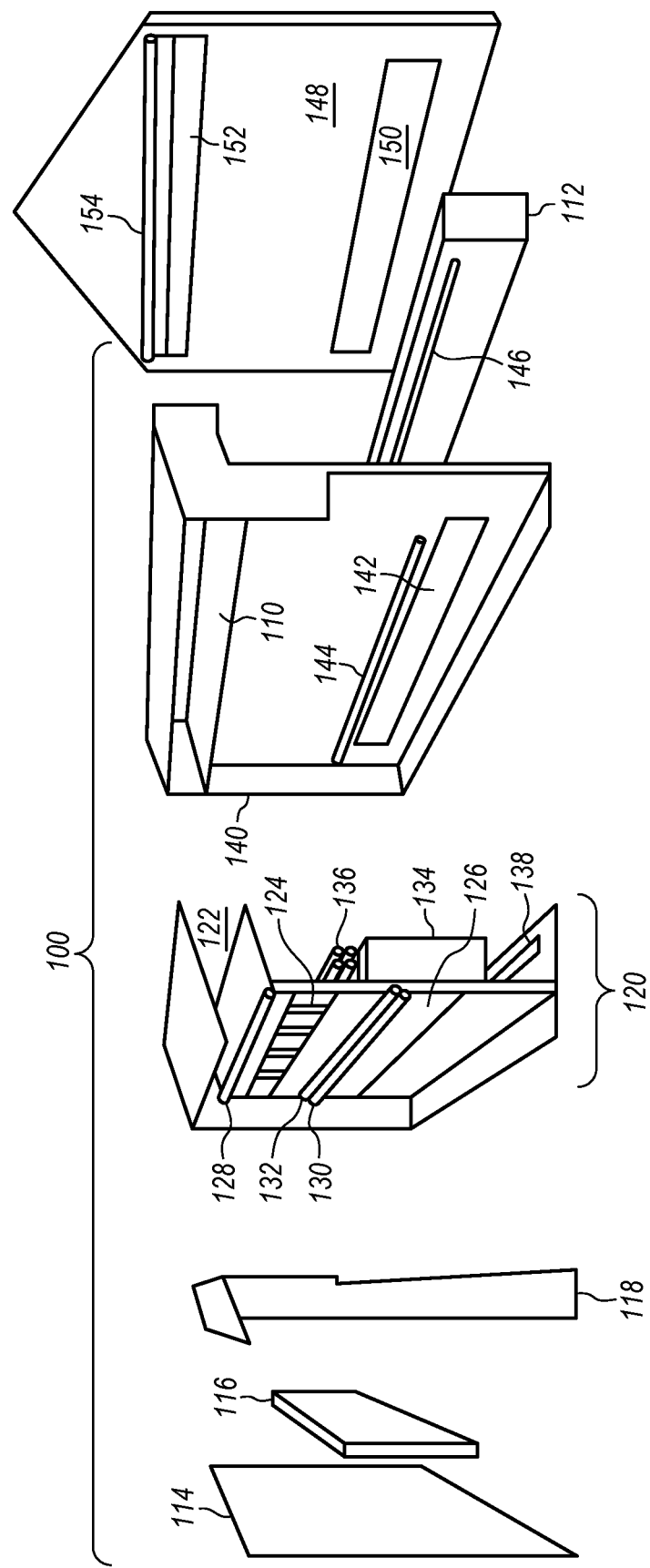
FIG. 2 illustrates an expanded view diagram of a modular environmental control system in accordance with an embodiment of the present invention.

FIG. 2 illustrates an expanded view diagram of an environmental control system module 100 in accordance with an embodiment of the present invention. The system module 100 of FIG. 2 is exemplary of the modules 100a and 100b shown in FIG. 1. As shown in FIG. 2, the module 100 includes an insect screen or mesh 114. The screen 114 is positioned in the path of ambient air (i.e. "fresh" air) entering the module 100 and is preferably positioned in or near an opening in an exterior wall of the module 100 so as prevent insects, animals and debris from entering the module 100. Also shown in FIG. 2 is an evaporative cooling medium 116, such as a water-absorbent pad. The pad 116 functions to cool ambient air entering the module 100. This is accomplished by saturating the pad 116 with water and causing ambient air to pass over or through the pad 116. Water from the pad 116 evaporates into the air which tends to cool the air and also tends to increase its water content or humidity. The cooling can be selectively activated by selectively delivering water to the pad 116 (e.g., via a water conduit—not shown in FIG. 2) and by selectively causing ambient air to enter the module 100.

FIG. 2 also shows an outer wall member 118 of the module 100. The outer wall member 118 functions as a structural component of the module 100 and also provides support for the insect screen 114 and evaporative pad 116. A closable door 180 (shown in FIG. 4) may be positioned at the outer wall member to selectively inhibit ambient air from entering the module 100 or to permit ambient air to enter the module 100.

Also shown in FIG. 2 is a center section 120 of the module 100. The center section 120 preferably includes a return air duct 122, one or more upper air openings 124 (which can also be referred to "bypass" air openings) and one or more lower air openings 126 (which can also be referred to "conditioned" air openings). The upper air openings 124 and the lower air openings 126 are preferably selectively closable. Therefore, as shown in FIG. 2, the center section 120 is equipped with mechanical coil (i.e. "roll-up") doors 128 and 130. The door 128 is positioned over the upper air opening(s) 124, while the door 130 is positioned over the lower air opening(s) 126. The doors 128 and 130 are preferably controllable to completely close or to completely open the corresponding openings 124 and 126 or to partially open/close the corresponding openings 124 and 126 to any selected degree. The doors 128 and 130 are preferably controllable independently of each other. While coiling doors are preferred due to space efficiency and ability to open or close the openings by any desired degree, other types of doors may be utilized, for example, sliding doors or shutters.

The center section 120 can also be equipped with a gas delivery conduit 132, which can be used to selectively emit gas (e.g., $CO_2$ gas) into the air passing through the module 100. For example, the conduit 132 may be connected to a $CO_2$ source, such as a natural gas heater or a gas canister, and a closable valve, such as that when the valve is opened, $CO_2$ gas is emitted into the module 100 though openings or nozzles in the conduit 132.

The center section 120 is preferably adapted to accommodate a variable number of heating, cooling and dehumidifying modules 134, which may also be referred to as air conditioning modules. To accomplish this, the center section 120 can include a rack with a number of spaces or receptacles into which heating, cooling and dehumidifying modules 134 can be installed. In an embodiment, the center section 120 can be populated with any number of heating, cooling and dehumidifying modules 134, depending on heating, cooling and dehumidifying capacity requirements for a particular installation. Air passing through the air opening 126 also passes through the heating, cooling and dehumidifying modules 134. Rack spaces or receptacles that are not populated with a heating, cooling and dehumidifying module 134 can be blocked until such time as a heating, cooling and dehumidifying module 134 is installed in that space or receptacle so as to prevent air flowing through the air opening 126 from flowing around the modules 134.

In an embodiment, the heating, cooling and dehumidifying modules perform their functions using heat transfer fluids. Therefore, as shown in FIG. 2, each heating, cooling and dehumidifying module 134 can be equipped with four heat transfer fluid conduits 136. The four fluid conduits 136 can include: cold, cold return, hot, and hot return. The center section 120 can also be equipped with a condensation collector 138 for collecting and removing condensate from the heating, cooling and dehumidifying modules 134. The fluid conduits 136 can be coupled to shared sources of heating and cooling fluids.

FIG. 2 also shows an inner wall member 140 of the module 100. The inner wall member 140 functions as a structural component of the module 100 and includes the return duct 110 (also shown in FIG. 1). The return duct 110 of the inner wall member 110 is preferably aligned with the return air duct 122 of the center section 120. The inner wall member 140 includes an opening 142 for the passage of air ("treated" air) to the enclosed structure 102a and 102b. A conduit 144 may be attached to the inner wall member 140 for dispensing water vapor for increasing humidity of the treated air. The conduit 144 may additionally or alternatively be utilized for dispensing vaporized aromatic oils which can be employed, for example, to counteract and control unpleasant odors associated with certain crops.

Still further, the module 100 may be equipped with a water ionizer for producing ionized water. The ionized water may then be vaporized and introduced to the structure 102 via the conduit 144 for plant disinfection and for controlling mold, fungus and pests. In other embodiments, the module 100 may be equipped with irrigation water treatment equipment, such as one or more ionizers, one or more devices for increasing dissolved gas (e.g., $CO_2$ or oxygen) such as a gas infusers, and/or water tempering equipment. Such treated water may then be used to irrigate crops within the structure 102. Moreover, water condensate, such as that collected by the condensation collector 138 may be recovered and recycled for crop irrigation. For example, the conduit 144, or some other irrigation conduit, may be extended from the module 100 and into the structure 102 for the above-described irrigation purposes.

Still further, hydronic heating may be employed within the structure 102. For example, as explained herein, conduits 136 (FIGS. 2 and 4) can be connected to a source of heated water, such as a boiler, which can be included within the module 100. The conduits 136, or some other conduit, may be extended from the module 100 and into the structure 102 for providing hydronic heating within the structure 102.

FIG. 2 also shows the duct 112 (also shown in FIG. 1). The duct 112 is preferably aligned with the opening 142 in the inner wall member 142 and directs treated air to the enclosed structure 102a and 102b. In an embodiment, the duct 112 is equipped with an ultraviolet light source 146 for sanitizing the treated air being returned to the enclosed structure 102a and 102b.

An end wall 148 of the enclosed structure 102a and 102b is also shown in FIG. 2. The end wall 148 is equipped with openings 150 and 152. The opening 150 allows treated air from the environmental control system module 100 to enter the enclosed structure 102a and 102b, while the opening 152 allows air from the enclosed structure 102a and 102b to enter the system module 100. One or both of the openings 150 and 152 can be selectively closable. As shown in FIG. 2, the opening 152 is closable with a mechanical coiling door 154. While FIG. 2 shows the door 154 attached to the end wall 148, the door 154 can alternatively be attached to the inner wall section 140 for selectively closing the duct 110.

Figure 3:
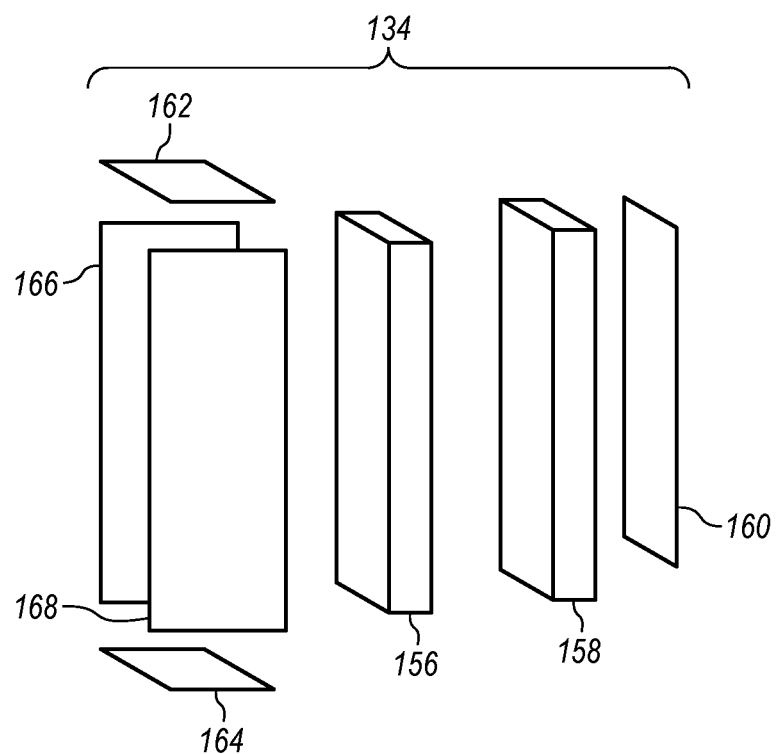
FIG. 3 illustrates an expanded view diagram of a heating, cooling and dehumidifying module in accordance with an embodiment of the present invention.

FIG. 3 illustrates an expanded view diagram of a heating, cooling and dehumidifying module 134 in accordance with an embodiment of the present invention. As explained in connection with FIG. 2, one or more of the heating, cooling and dehumidifying modules 134 can be used to populate the environmental control system module 100, for example, the center section 120 of the module 100. As shown in FIG. 3, the heating, cooling and dehumidifying module 134 may include a cooling element 156, a heating element 158 and an air filter 160. The cooling element 156 functions by extracting heat energy from air passing over the cooling element 156. The cooling element 156 may include, for example, a cooling coil in which a cooling fluid, e.g., water or refrigerant, is circulated. The cooling element 156 can be, for example, a component of a chiller cooling system or an air conditioning system which also includes a compressor, condenser and other conventional air conditioning system components. Multiple heating, cooling and dehumidifying modules 134 can be installed in the system module 100 with their cold fluid conduits 136 coupled together. In this way, a single source of cooling fluid may provide cooling fluid to multiple heating, cooling and dehumidifying modules 134 installed in the system module 100, though depending on requirements, multiple sources of cooling fluid may be employed.

The heating element 158 functions to transfer heat energy into air passing over the heating element 158. The heating element 158 may include, for example, a heating coil in which a heated fluid, e.g., hot water, is circulated. The circulated water may be heated in a boiler. Alternatively, the heating element 158 may include an electric heating coil or gas burner. The heating, cooling and dehumidifying module 134 may also be referred to as an air conditioning module. Broadly, such an air conditioning module can include one or more of an air cooler; an air heater and an air filter. Multiple heating, cooling and dehumidifying modules 134 can be installed in the system module 100 with their hot fluid conduits 136 coupled together and/or to a common conduit. In this way, a single boiler may provide heated fluid to multiple heating, cooling and dehumidifying modules 134 installed in the system module 100, though depending on requirements, multiple boilers may be employed.

FIG. 3 also shows an expanded view of a shroud for the heating, cooling and dehumidifying module 134. The shroud may include a shroud top 162, a shroud bottom 164 and shroud sides 166 and 168. The shroud is configured to direct air which enters the heating, cooling and dehumidifying modules 134 to pass through the cooling element 156, the heating element 158 and the air filter 160.

Figure 4:
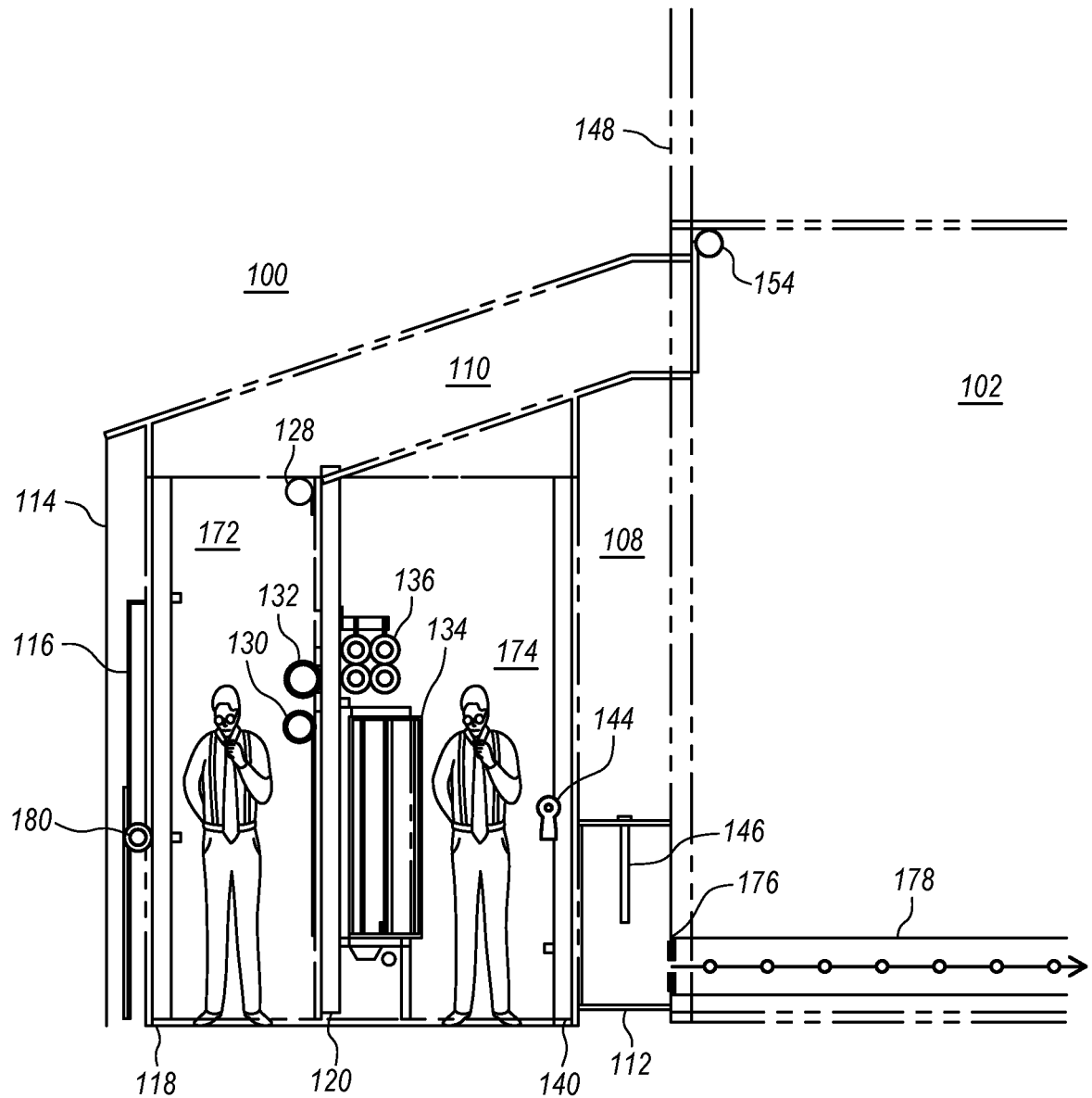
FIG. 4 illustrates a side cut-away view of a modular environmental control system in accordance with an embodiment of the present invention.

FIG. 4 illustrates a side cut-away view of a modular environmental control system in accordance with an embodiment of the present invention. FIG. 4 shows many of the components of the module 100 that are also shown in FIGS. 1 and 2. This includes: the void or space 108; the ducts 110 and 112; the screen 114; the evaporative cooling pad 116; the outer wall member 118; the door 128; the door 130; the conduit 132; the heating, cooling and dehumidifying module 134; the center section 120; the inner wall member 140; the conduit 144; the ultraviolet light source 146; and the door 154. Also shown in FIG. 4 are conduits 136. Similarly to the conduits 136 of FIG. 2, the conduits 136 may be attached to the center section 120 and used to carry heating fluid, and cooling fluid. Additional conduits may be provided, e.g., attached to the center section 120 or elsewhere, for carrying electrical power and control signals to components of the system module 100, such as the heating, cooling and dehumidifying modules 134, doors 128, 130 and 154, fan(s) 176 and lighting (e.g., light 146). Conduits may also be provided to carry $CO_2$ gas, water for the cooling pad 116, aromatic oils, etc. Further, conduits, such as the conduits 136, of one of the modules (e.g., module 102a) can be connected to the conduits of one or more other the modules (e.g., module 102b) so that multiple system modules 100 can share common resources.

FIG. 4 also depicts a possible scale of the system module 100 by illustrating a person standing within an air chamber 172 formed between the outer wall 118 and center section 120 and by illustrating a person standing within an air chamber 174 formed between the center section 120 and inner wall 140. By providing sufficient room for a person to enter portions of the module 100, ease of configuration and maintenance of the module 100 is enhanced. The openings 104 and 106, which are illustrated in FIG. 1 and preferably equipped with closable doors, can be used to by personnel to enter and access the chambers 172 and 174, respectively. During operation of the environmental control system, the persons would generally not be present within the chambers 172 or 174.

FIG. 4 also depicts a possible scale of the system module 100 by illustrating a person standing within an air chamber 172 formed between the outer wall 118 and center section 120 and by illustrating a person standing within an air chamber 174 formed between the center section 120 and inner wall 140. By providing sufficient room for a person to enter portions of the module 100, ease of configuration and maintenance of the module 100 is enhanced. The openings 104 and 106, which are illustrated in FIG. 1 and preferably equipped with closable doors, can be used by personnel to enter and access the chambers 172 and 174, respectively. During operation of the environmental control system, the persons would generally not be present within the chambers 172 or 174. The first and second air chambers 172 and 174 are modularly expansible by extending their length or by coupling additional air chambers lengthwise. The fluid conduits 136 are expansible in length thereby increasing a number of air conditioning modules to which the fluid conduits carry heated or cooled water.

A closable door 180, such as a coiling door, may be provided at the outer wall member 118 which is configured to selectively permit fresh air to enter the module 100. Similar to the doors 128, 130 and 154, the door 180 is preferably configured so that it can be fully opened, fully closed or opened to any degree between fully opened and fully closed. While a coiling door is preferred, another type of door may be employed such as a sliding door.

As mentioned, activation of the fans 176 causes air from the module 100 to be drawn into the enclosed structure 102 via the duct 176. This creates a negative pressure in the module 100 which causes air to be drawn into the module 100 from the structure 102 via the duct 110 and/or from the ambient, depending upon which of the doors 154 and 180 are open. The airflow volume can be controlled by selectively controlling the speed (i.e. revolutions per minute or RPM) of the one or more of the fans 176 and/or by selectively turning on or off all or a subset of the fans 176.

By selectively opening and/or closing the doors 128, 130, 154 and 180 and by selectively activating or controlling components of the environmental control system module 100, such as the heating, cooling and dehumidifying modules 134, the evaporative pad 116, the gas distribution conduit 132, the vapor emitting conduit 144 and the fans 176, a broad range of environmental control over the indoor environment of the enclosed structure 102 can be achieved. The following are examples of some specific environmental control configurations (also referred to as "modes") though it will be apparent that other configurations or modes are possible.

Figure 5:
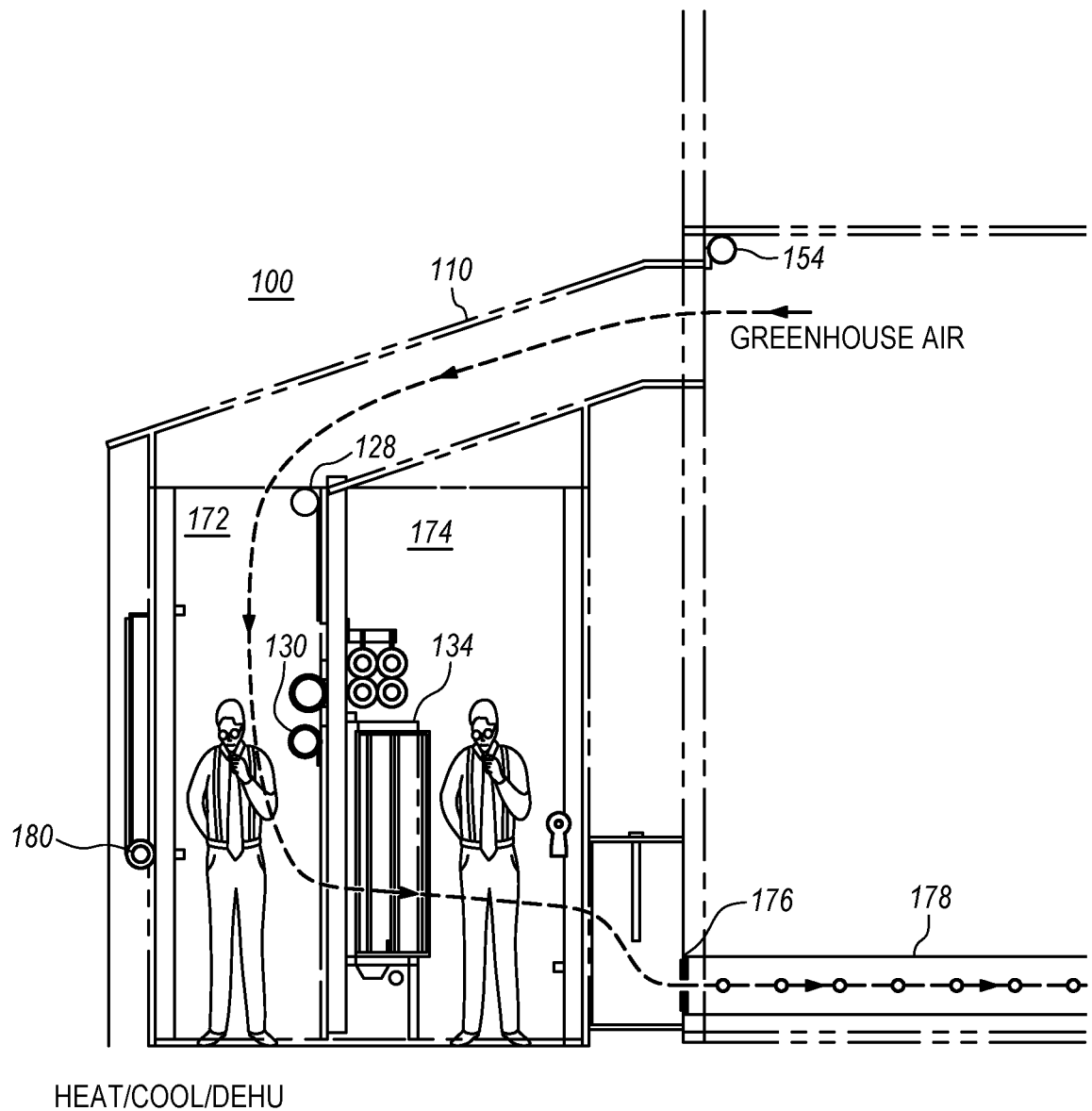
FIG. 5 illustrates a side cut-away view of a modular environmental control system in a heating, cooling and/or dehumidification configuration in accordance with an embodiment of the present invention.

FIG. 5 illustrates a side cut-away view of a modular environmental control system module 100 in a heating, cooling and/or dehumidification configuration in accordance with an embodiment of the present invention. As shown in FIG. 5, the doors 130 and 154 are at least partially open while the doors 128 and 180 are closed and one or more of the fans 176 is on. In this configuration, air (which may be referred to as "greenhouse air") from the enclosed structure 102 passes through the duct 110 and enters the chamber 172. The air then passes from the chamber 172 and into the chamber 174 through the heating, cooling and dehumidifying modules 134. The air then exits the chamber 174 and returns to the enclosed structure 102 though the fan(s) 176 and duct 178. This configuration allows the heating, cooling and dehumidifying modules 134 to cool and/or heat, and possibly also dehumidify, the air. Activation of the heating, cooling and dehumidifying module 134 to cool the air will also reduce humidity of the air by causing water vapor to condensate out of the air. Dehumidification without cooling can be accomplished by activating both the heating and cooling coils of the heating, cooling and dehumidifying module 134.

Figure 6:
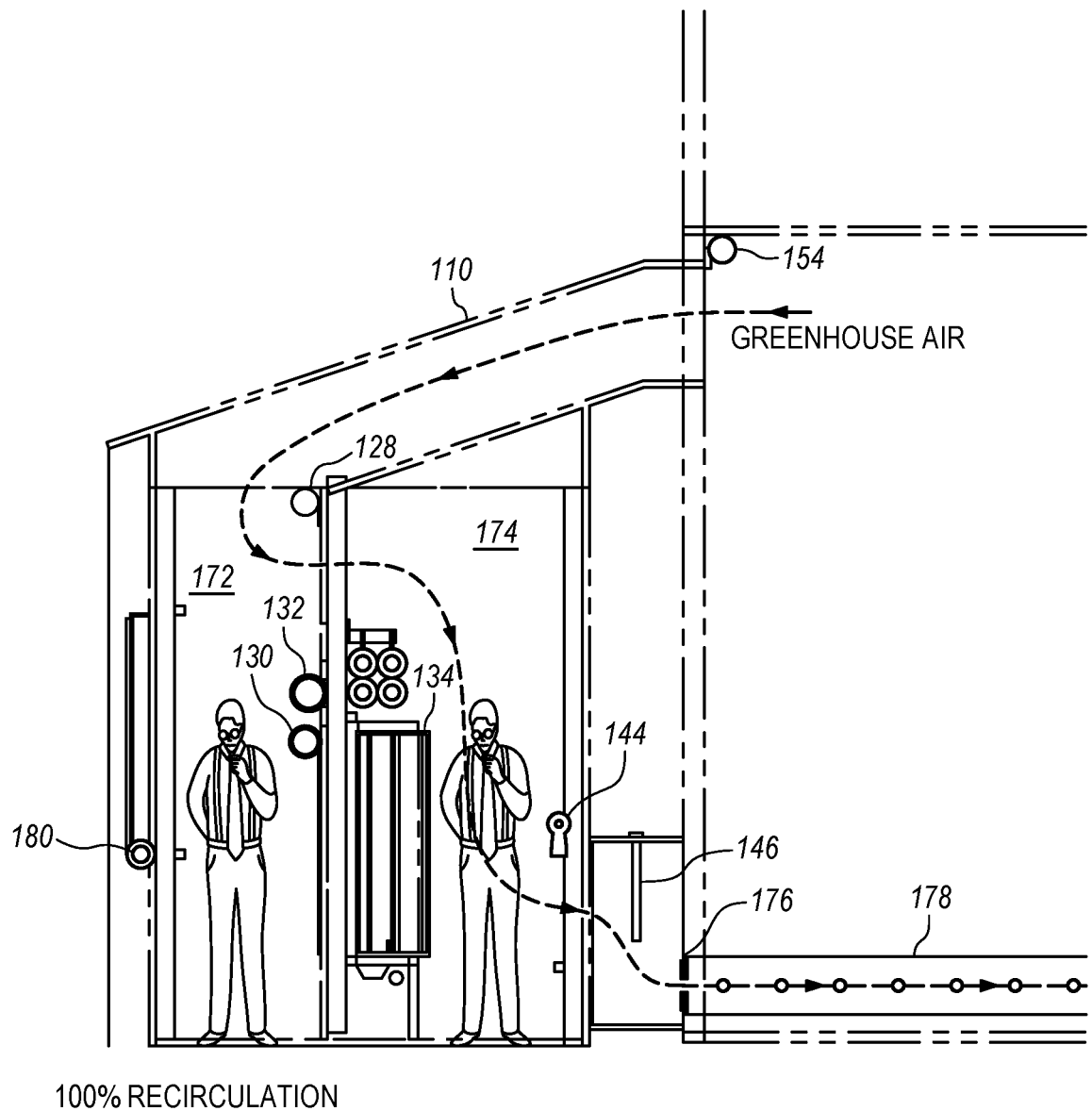
FIG. 6 illustrates a side cut-away view of a modular environmental control system in a recirculation configuration in accordance with an embodiment of the present invention.

FIG. 6 illustrates a side cut-away view of a modular environmental control system module 100 in a recirculation configuration in accordance with an embodiment of the present invention. As shown in FIG. 6, the doors 128 and 154 are at least partially open while the doors 130 and 180 are closed and one or more of the fans 176 is on. In this configuration, greenhouse air from the enclosed structure 102 passes through the duct 110 and enters the chamber 172. The air then passes from the chamber 172 into the chamber 174 through openings 124 (FIG. 2) thereby bypassing the heating, cooling and dehumidifying module 134. The air then exits the chamber 174 and returns to the enclosed structure though the fan(s) 176 and duct 178. This configuration essentially recirculates the air without significant heating or cooling. This can be used to treat the greenhouse air in another manner, such as to equalize temperatures throughout the enclosed structure 102, e.g., by drawing hotter air from the top portion of the structure and delivering it to the lower portion of the structure. This configuration can also be used to treat the air in various ways. As non-limiting examples, present invention may treat the air by distributing $CO_2$ gas (e.g. via conduit 132), by increasing humidity (e.g. by disbursing water vapor via conduit 144), by distributing vaporized aromatic oils (e.g. via conduit 144), by deodorizing the air (e.g., by using ozone gas or an ozone gas generator), and/or by sanitizing the air (e.g., by using UV light source 146). It should be noted that such air treatments can be employed in any of the system configurations or modes described herein.

Figure 7:
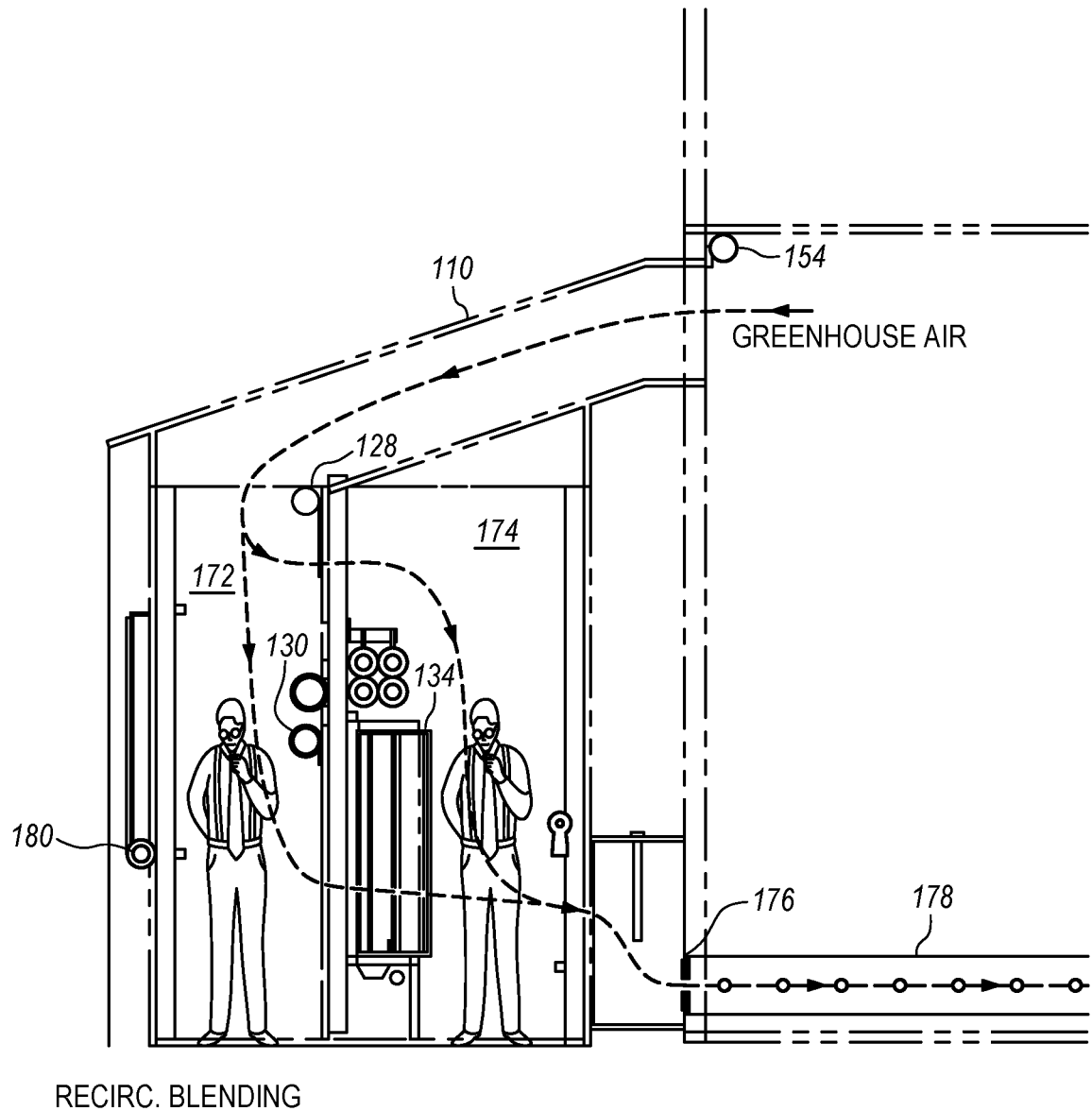
FIG. 7 illustrates a side cut-away view of a modular environmental control system in a recirculation blending configuration in accordance with an embodiment of the present invention.

FIG. 7 illustrates a side cut-away view of a modular environmental control system module 100 in a recirculation blending configuration in accordance with an embodiment of the present invention. As shown in FIG. 7, the doors 128, 130 and 154 are at least partially open while the door is 180 is closed and one or more of the fans 176 is on. In this configuration, greenhouse air from the enclosed structure 102 passes through the duct 110, enters the chamber 172. The air then passes from the chamber 172 and into the chamber 174 via two paths. A first path is through openings 124 (FIG. 2) and which bypasses the heating, cooling and dehumidifying modules 134. A second path is through the heating, cooling and dehumidifying modules 134. The air from these two paths mixes in the chamber 174 before exiting the chamber 174 and returning to the enclosed structure though the fan(s) 176 and duct 178. This configuration essentially accomplishes both recirculation and related environmental control strategies described above in connection with FIG. 6, as well as heating, cooling and/or dehumidification, as described above in connection with FIG. 5. One or both of the doors 128, 130 may be partially open by any degree in order to achieve a desired amount of airflow through the two alternative paths described above.

Figure 8:
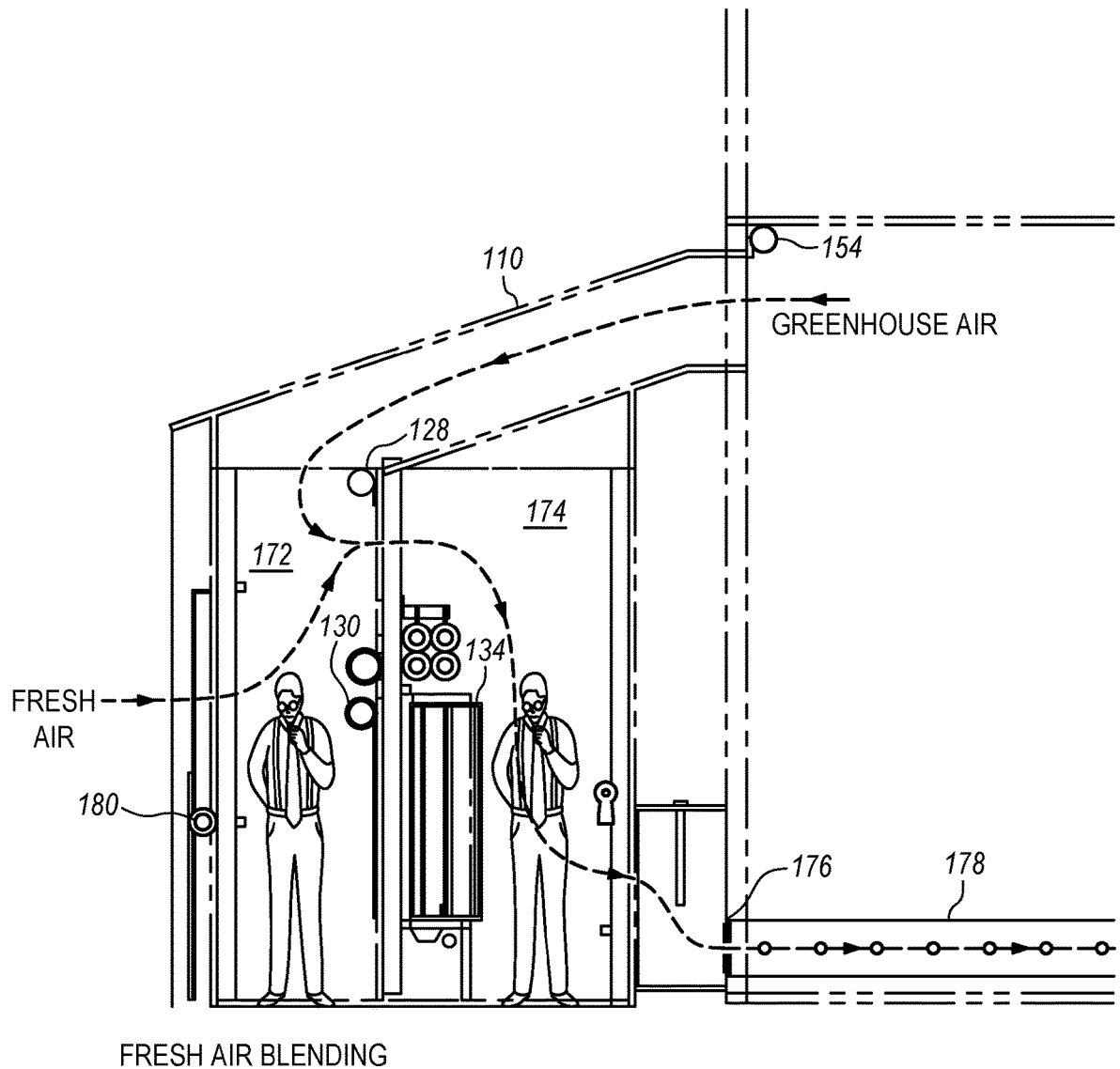
FIG. 8 illustrates a side cut-away view of a modular environmental control system in a fresh air blending configuration in accordance with an embodiment of the present invention.

FIG. 8 illustrates a side cut-away view of a modular environmental control system module 100 in a fresh air blending configuration in accordance with an embodiment of the present invention. As shown in FIG. 8, the doors 128, 154 and 180 are at least partially open while the door is 130 is closed and at least one of the fans 176 is on. In this configuration, greenhouse air from the enclosed structure 102 follows a first path which passes through the duct 110 and enters the chamber 172. Simultaneously, fresh air from the ambient enters the chamber 172 through the door 180 thereby following a second path. Air from these two paths mixes in the chamber 172 and then passes into the chamber 174 via the door 128. The air then exits the chamber 174 and returns to the enclosed structure though the fan(s) 176 and duct 178. This configuration essentially blends greenhouse air and fresh air together, bypassing the heating, cooling and dehumidifying modules 134. In this configuration, evaporative cooling may optionally be applied to the fresh air by adding water to the evaporative cooling medium 116 (FIG. 2). One or both of the doors 154, 180 may be partially open by any degree in order to achieve a desired amount of airflow through the two alternative paths described above.

Figure 9:
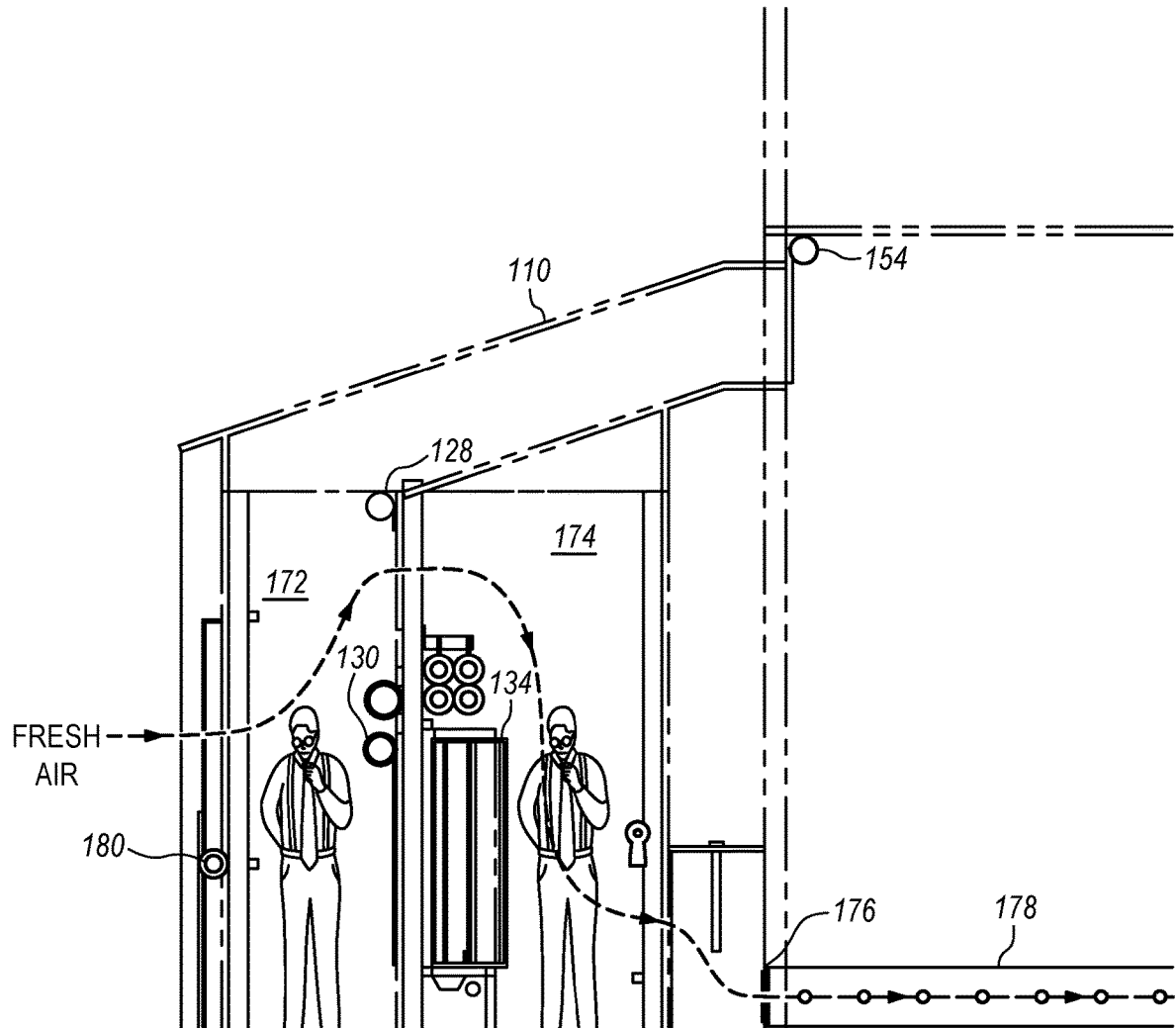
FIG. 9 illustrates a side cut-away view of a modular environmental control system in a fresh air cooling configuration in accordance with an embodiment of the present invention.

FIG. 9 illustrates a side cut-away view of a modular environmental control system module 100 in a fresh air cooling configuration in accordance with an embodiment of the present invention. As shown in FIG. 9, the doors 128 and 180 are at least partially open while the doors 130 and 154 are closed and at least one of the fans 176 is on. In this configuration, fresh air from the ambient enters the chamber 172 through the door 180. The air then passes from the chamber 172 and into the chamber 174 through openings 124 (FIG. 2) bypassing the heating, cooling and dehumidifying modules 134. The air then exits the chamber 174 and returns to the enclosed structure though the fan(s) 176 and duct 178. This configuration essentially replaces air within the enclosed structure 102 with fresh air. Because the door 154 is closed and air is not drawn from the enclosed structure 102, positive air pressure (i.e. greater than ambient air pressure) is created within the structure 102. Vents in the structure 102 can be opened to allow air to escape to the ambient. This configuration can be used to exclude pests (e.g., insects) from the structure 102 and/or to replace the air in the structure 102 with fresh air, for example, to purge $CO_2$ gas from the structure 102. This configuration can also be used to distribute $CO_2$ gas (e.g. via conduit 132), vaporized aromatic oils (e.g. via conduit 144) and/or to sanitize the air (e.g., by using UV light source 146).

Figure 10:
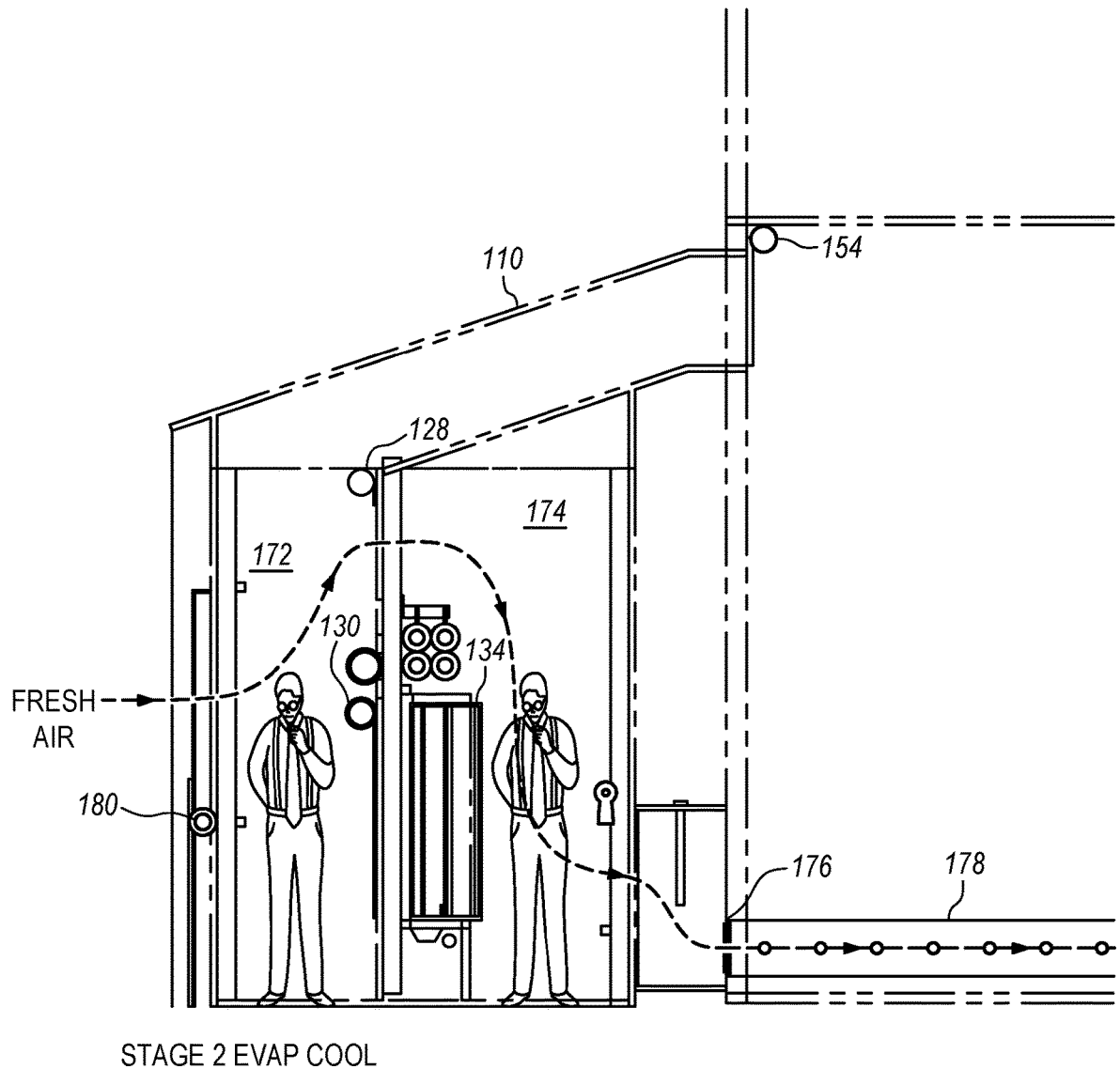
FIG. 10 illustrates a side cut-away view of a modular environmental control system in an evaporative cooling configuration in accordance with an embodiment of the present invention.

FIG. 10 illustrates a side cut-away view of a modular environmental control system module 100 in an evaporative cooling configuration in accordance with an embodiment of the present invention. In this configuration, fresh air from the ambient enters the chamber 172 through the door 180 which is at least partially open. The air then passes from the chamber 172 and into the chamber 174 through openings 124 (FIG. 2) bypassing the heating, cooling and dehumidifying modules 134. The air then exits the chamber 174 and returns to the enclosed structure though the fan(s) 176 and duct 178. This configuration is similar to that of FIG. 9 except that, in the configuration of FIG. 10, evaporative cooling may optionally be applied to the fresh air by adding water to the evaporative cooling medium 116 (FIG. 2) Similarly to FIG. 9, in accordance with the configuration of FIG. 10, the doors 128 and 180 are at least partially open while the doors 130 and 154 are closed and at least one of the fans 176 is on.

In any of the configurations or modes of FIGS. 5-10, the volume of airflow can be adjusted by controlling the degree to which the various doors 128, 130, 154 and 180 are opened and/or by controlling the number of fans 176 which are turned on and/or by controlling fan(s) 176 speed.

It will be apparent that other configurations or modes are possible. For example, all of the doors 128, 130, 154 and 180 may open at least partially. Thus, in the configuration illustrated in FIG. 7, the door 180 can be at least partially opened. Additionally, fresh air from the ambient could be heated, cooled and/or dehumidified using heating, cooling and dehumidifying modules 134, for example, by modifying the configurations of FIG. 8 or 9 so that the door 130 is at least partially open so that air from the chamber 172 passes through the heating, cooling and dehumidifying modules 134 with the heating, cooling and dehumidifying modules 134 being activated to heat, cool and/or dehumidify the air.

Figure 11:
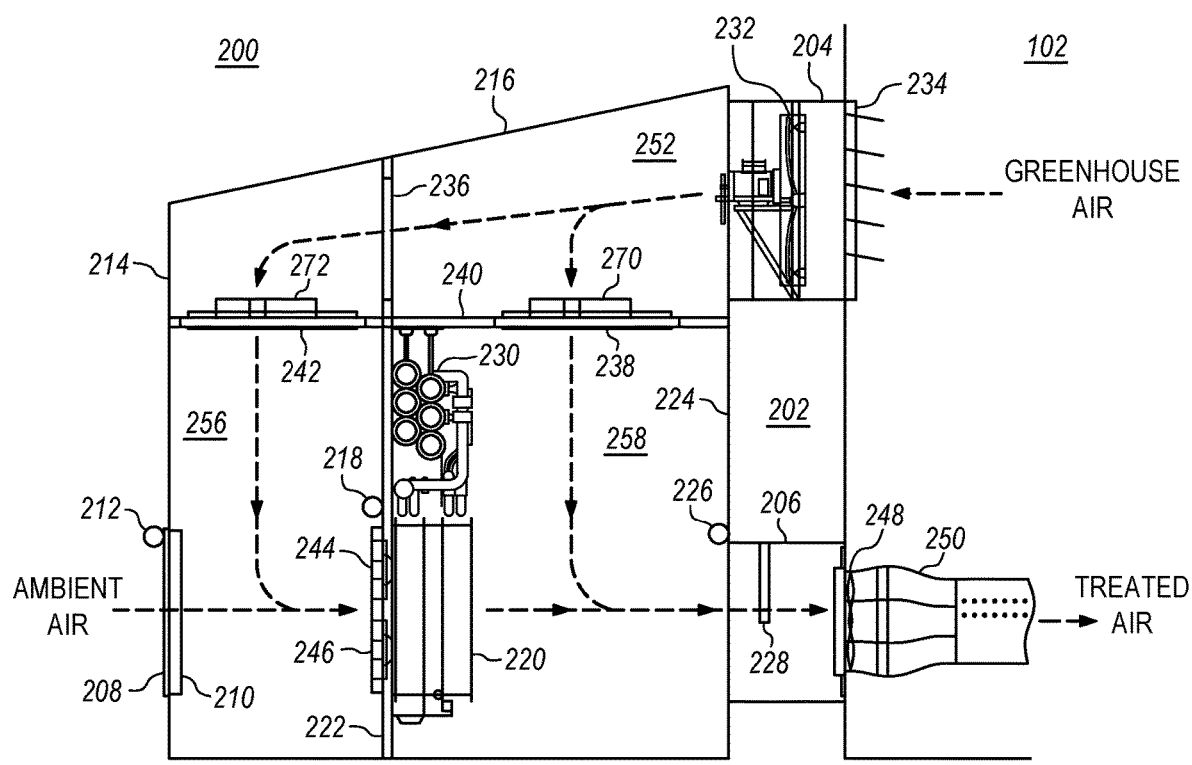
FIG. 11 illustrates a side cut-away view of a modular environmental control system in accordance with an alternative embodiment of the present invention.

FIG. 11 illustrates a side cut-away view of a modular environmental control system module 200 in accordance with an alternative embodiment of the present invention. The module 200 shown in FIG. 11 has similar features and functions to the embodiment 100 shown in FIG. 4, but with some differences explained herein. Significantly, the embodiment shown in FIG. 11 permits air from the enclosed structure 102 to selectively flow into either or both of two chambers 256, 258 of the module 200.

More particularly, the system shown in FIG. 11 includes: a void or space 202 interposed between the module 200 and the enclosed structure 102; ducts 204 and 206; a screen 208; an evaporative cooling pad 210; a roller door 212; an outer wall member 214; a roof member 216; conduit 218; one or more heating, cooling and dehumidifying modules 220; a center section 222; an inner wall member 224; conduit 226; an ultraviolet light source 228; and conduits 230. Also shown in FIG. 11 are: a fan 232; shutters 234; one or more openings 236 in the center section 222; shutters 238; ceiling member 240; shutters 242; fans 244, 246 and 248; and a duct 250.

As compared to the system module 100 of FIG. 4, the system module 200 includes the fan 232 at the interface between the structure 102 and the module 200 which assists in moving greenhouse air from the structure 102 to the module 102, whereas, FIG. 4 does not show such a fan 232. It will be apparent, however, that the module 100 of FIG. 4 may be equipped with such fan. Similarly, the system module 200 includes the fans 244, 246 at heating, cooling and dehumidifying modules 220 which assist in moving air through the heating, cooling and dehumidifying modules 220, whereas, FIG. 4 does not show such fans 244, 246. It will be apparent, however, that the system module 100 of FIG. 4 may be equipped with one more such fans. The heating, cooling and dehumidifying modules 220 may also be referred to as air conditioning modules.

The system module 200 is operable in any of several configurations or modes by selectively opening or closing the door 212 or shutters 234, 238, and 242 and by selectively activating the fans 232, 244, 246 and 248. For example, in a heating, cooling and/or dehumidification configuration or mode, the shutters 234 and 242 may be open while the shutters 238 and the door 212 may be closed. The fans 232, 244, 246 and 248 may be turned on. In this case, greenhouse air passes through the shutters 234 and duct 204 and to enter a plenum 252 formed between the roof 216 and the ceiling member 254. This air may then pass through the one or more openings 236 in the center section 222 and through the shutters 242 to enter the chamber 256. This air may then pass through the heating, cooling and dehumidifying modules 220 and into the chamber 258. The heating, cooling and dehumidifying modules 220 can treat this air by heating, cooling or a combination thereof (to achieve heating, cooling and/or dehumidification as explained herein). The fans 244 and 246 may assist in moving the air through the heating, cooling and dehumidifying modules 220. The treated air may then return to the enclosed structure 102 from the chamber 258 through the duct 206, the fan 248 and the duct 250.

As another example, the system module 200 may be operated in a recirculation configuration or mode. In this case, the shutters 234 and 238 may be open while the shutters 242 and the door 212 may be closed. The fans 232 and 248 may be turned on while the fans 244 and 246 may be off. Greenhouse air passes through the shutters 234 and duct 206 and then enters the plenum 252. This air may then pass through the shutters 238 to enter the chamber 258. The air may then return to the enclosed structure from the chamber 258 through the duct 206, the fan 248 and the duct 250.

As yet another example, the system module 200 may be operated in a recirculation blending configuration which is essentially a combination of the above-described modes. In this case, the shutters 234, 238 and 242 may be open while the door 212 may be closed. The fans 232, 244, 246 and 248 may be turned on. Greenhouse air passes through the shutters 234 and duct 206 and enters the plenum 252. A portion of this air may then enter the chamber 256 through the shutters 242 while another portion of the air may enter the chamber 258 through the shutters 238. Air from the chamber 256 may then pass through the heating, cooling and dehumidifying modules 220 and into a chamber 258. The heating, cooling and dehumidifying modules 220 can treat this air by heating, cooling or a combination thereof (to achieve heating, cooling and/or dehumidification as explained herein). The treated air from the heating, cooling and dehumidifying modules 220 may then be blended in the chamber 258 with the air that passed through the shutters 238. The blended air may then return to the enclosed structure from the chamber 258 through the duct 206, the fan 248 and duct 250.

In another example, the system module 200 may be operated in a fresh air blending configuration or mode. In this case, the door 212 may opened while the heating, cooling and dehumidifying modules 244 and 246 may be turned off (deactivated). The fans 232, 244, 246 and 248 may be turned on. One or both of the shutters 238 and 242 may be open. Greenhouse air passes through the shutters 234 and duct 206 and then enters the plenum 252. This air may then pass through one or both of the shutters 238 and 242 to enter one or both of the chambers 256 and 258. Meanwhile fresh air may be drawn into the chamber 256 through the opening in the wall 214 by negative pressure created by the fans 244 and 246. Air from the chamber 256 may then enter the chamber 258. The air may then return to the enclosed structure from the chamber 258 through the duct 206, the fan 248 and duct 250. The fresh air may be blended with the greenhouse air in either or both of the chambers 256 or 258 depending upon which of the shutters 238 and 242 are open. In this configuration, however, it may be most advantageous to close the shutters 242 (with the shutters 238 being open) so as to maximize fresh air being drawn into the chamber 256, in which case the blending will occur in the chamber 258. In this mode, evaporative cooling may optionally be applied to the fresh air by adding water to the evaporative cooling medium 210.

In yet another example, the system module 200 may be operated in a fresh air cooling configuration or mode. In this case, the shutters 234, 238 and 242 may be closed and the fan 232 turned off. The door 212 is at least partly open while the fans 244 and 246 are turned on. Fresh air may be drawn into the chamber 256 through the opening in the wall 214 by negative pressure created by the fans 244 and 246. This air may then be directed to the enclosed structure from the chamber 258 through the duct 206, the fan 248 and the duct 250. This configuration essentially replaces air within the enclosed structure 102 with fresh air. Because air is not drawn from the enclosed structure 102, vents in the structure 102 can be opened to allow air to escape to the ambient. This configuration can be used to exclude pests (e.g., insects) from the structure 102 and/or to replace the air in the structure 102 with fresh air, for example, to purge $CO_2$ gas from the structure 102. This configuration can also be used to distribute $CO_2$ gas (e.g. via conduit 218), vaporized aromatic oils (e.g. via conduit 226) and/or to sanitize the air (e.g., by using UV light source 218). Evaporative cooling may optionally be applied to the fresh air by adding water to the evaporative cooling medium 210. In fact, in any of the above-described modes, $CO_2$ gas can be distributed in the treated air (e.g. via conduit 218), vaporized aromatic oils can be distributed in the treated air (e.g. via conduit 226) and/or the air can be sanitized (e.g., by using UV light source 218).

It will be apparent that any of the roller door 212 or shutters 234, 238, 242 illustrated in FIG. 11 can be replaced by another type of selectively closable door. It will also be apparent that in at least some of the above-described modes, the shutters 238 and 242 are at least partly open. In this case, the relative amount of airflow through these different paths can be adjusted by controlling the degree by which the shutters 238 and 242 are opened. Similarly, in at least some of the above-described modes, the door 212 and one or more of shutters 234, 238 and 242 are at least partly open. In this case, the relative amount of airflow through the different paths can be adjusted by controlling the degree by which the door 212 and one or more of shutters 234, 238 and 242 are opened.

As shown in FIG. 11, conduits 230 may be attached to the ceiling 240 (or the center section 222) and used to carry heating fluid, cooling fluid, electrical power and control signals to components of the system module 200, such as the heating, cooling and dehumidifying modules 220, doors 212 or shutters 234, 238, 242, fans 232, 248 and lighting (e.g., light 218). Similarly to the conduits 136 of FIGS. 2 and 4, the conduits 230 may also carry $CO_2$ gas, water for the cooling pad 210, aromatic oils, etc. Further, conduits 230 of one of the modules (e.g., module 200) can be connected to the conduits of one or more other the modules so that multiple such system modules 200 can share these common resources. While the conduits 136 and 230 of FIGS. 2, 4 and 11 are centrally located within the modules 100 and 200 (i.e. adjacent to the center sections 120 and 222, respectively), it will be apparent that the conduits 136 and 230 can be positioned in other locations within the modules 100 and 200, such as near the outer walls 114 or 214 or near inner walls 140 or 224.

The module of FIG. 11 may scaled similarly to that of FIG. 4 in that the chambers 256 and 258 may be sufficiently large that a person may stand within them. By providing sufficient room for a person to enter portions of the module 200 ease of configuration and maintenance of the module 200 is enhanced. The module 200 may be provided with openings 104 and 106 as illustrated in FIG. 1 which can be used to access the chambers 256 and 258, respectively.

Similarly to the module 100, the module 200 of FIG. 11 may be equipped with a water ionizer for producing ionized water which may be vaporized and introduced to the structure 102 via the conduit 226. Also, as explained in connection with the module 100, the module 200 may be equipped with irrigation water treatment equipment and/or water condensate collection equipment which can be used to treat and/or collect and recycle water used to irrigate crops located within the structure 102. Still further, the nodule may be equipped to provide hydronic heating to the structure 102. For example, conduits 230 can be connected to a source of heated water, such as a boiler, which can be included within the module 200. The conduits 230, or some other conduit, may be extended from the module 200 and into the structure 102 for providing hydronic heating within the structure 102.

Figure 12:
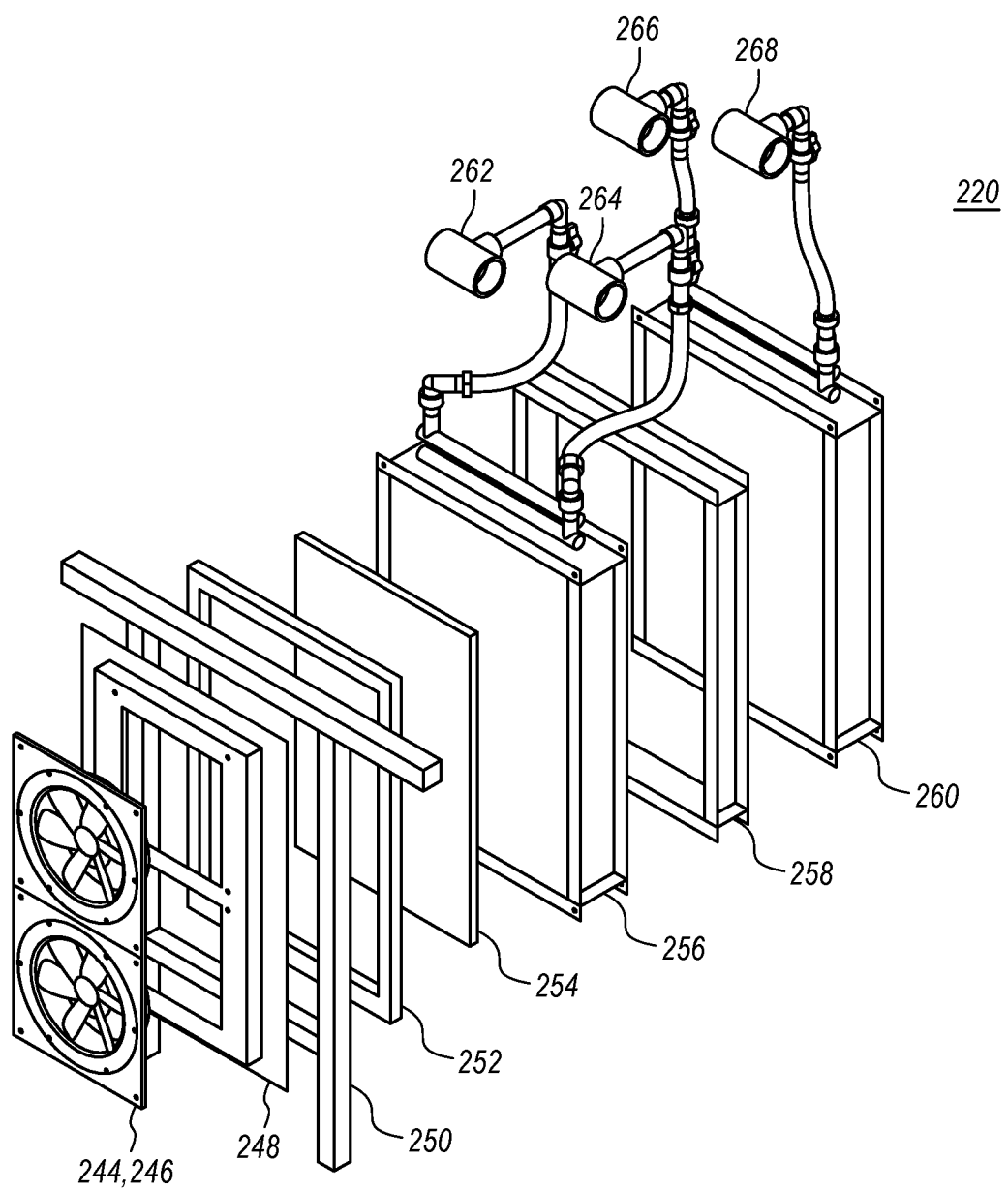
FIG. 12 illustrates an expanded view diagram of a heating, cooling and dehumidifying module in accordance with an embodiment of the present invention.

FIG. 12 illustrates an expanded view diagram of a heating, cooling and dehumidifying module 220 in accordance with an embodiment of the present invention. The heating, cooling and dehumidifying module 220 of FIG. 12 may be utilized as a sub-assembly of the system module 100. For example, a selected number of such heating, cooling and dehumidifying modules 220 may be mounted to corresponding receptacles of the system module 200, with non-utilized receptacles preferably having their airflow blocked off as explained in connection with the system module 100. Similarly, the heating, cooling and dehumidifying module 220 of FIG. 12 may be utilized in place of the heating, cooling and dehumidifying modules 134 of the system module 100.

As shown in FIG. 12, the heating, cooling and dehumidifying module 220 of FIG. 12 includes: the fans 244, 246; fan shroud 248; coil support frame 250; coil seal and spacer frame 252; air filter 254; cooling coil 256; coil mating shroud 258; and heating coil 260. Attached to the cooling coil 256 are cooling fluid conduit connectors 262, 264. Attached to the heating coil 260 are heating fluid conduit connectors 266, 268. The connectors 262, 264, 266, and 268 can be connected to the conduits 230.

Figure 13:
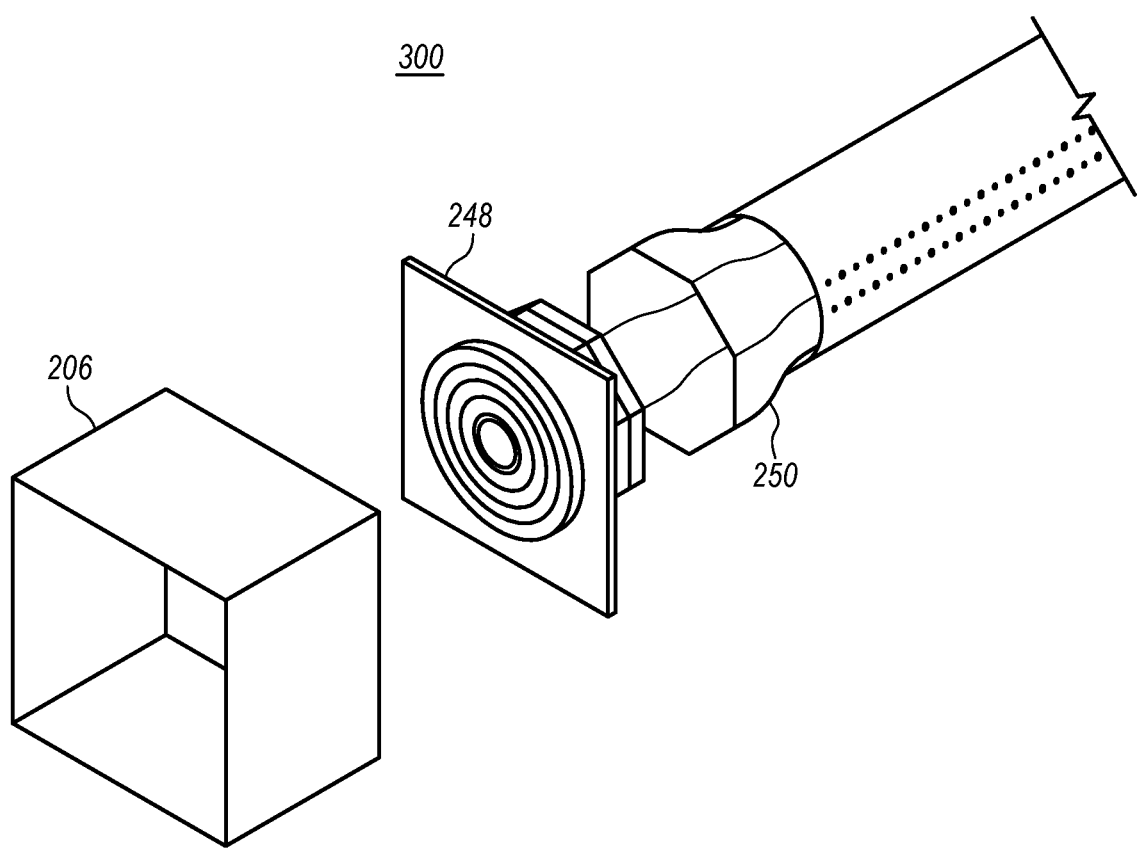
FIG. 13 illustrates an expanded view diagram of a fan and ducting assembly in accordance with an embodiment of the present invention.

FIG. 13 illustrates an expanded view diagram of a fan and ducting assembly 300 in accordance with an embodiment of the present invention. The fan and ducting assembly 300 may be utilized as a subassembly of the system module 200. Accordingly, the assembly 300 includes the duct 206, the fan 248 and duct 248 which are also shown in FIG. 11. The fan and ducting assembly 300 may also be utilized as a subassembly of the system module 100 in place of the ducts 112 and 178 (FIG. 4).

Figure 14:
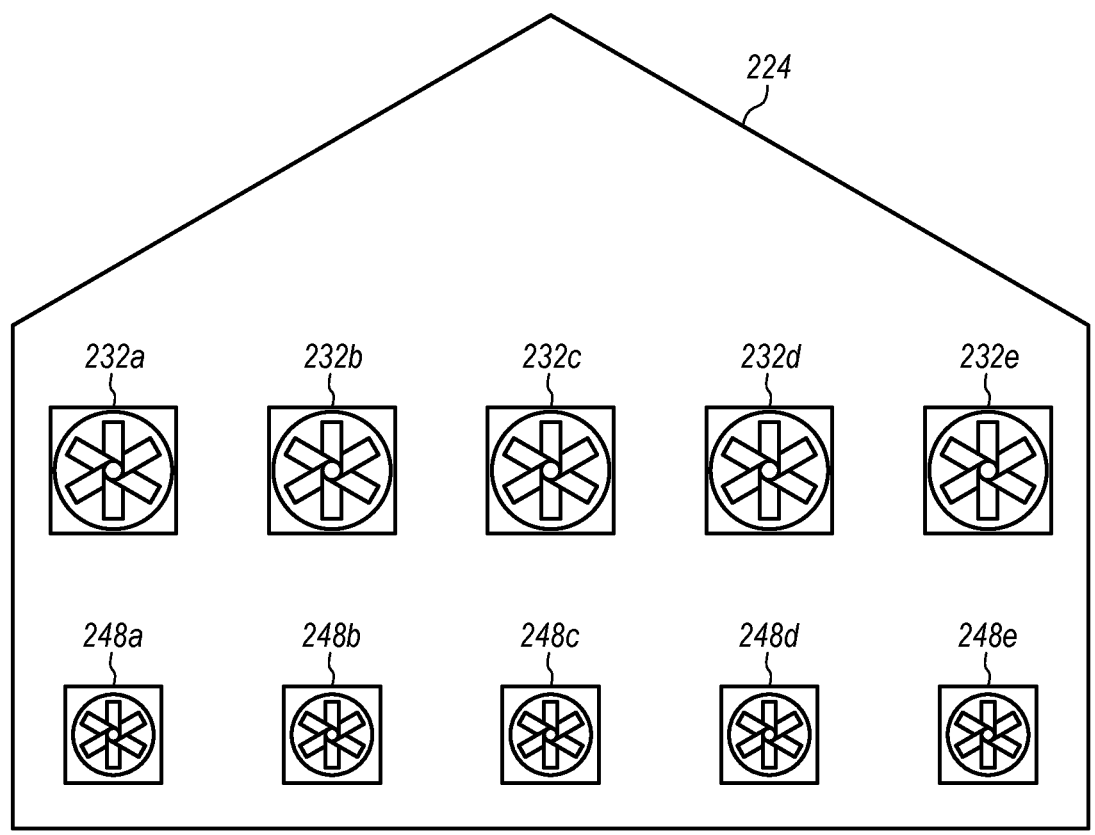
FIG. 14 illustrates an embodiment of fans of a modular environmental control system mounted to an end wall portion of an enclosed structure in accordance with an embodiment of the present invention.

FIG. 14 illustrates an embodiment of fans of a modular environmental control system mounted to an end wall portion 224 of an enclosed structure in accordance with an embodiment of the present invention. As shown in FIG. 14, fans 232*a-e* (also shown in FIG. 11 as item 232) are mounted or otherwise coupled to the end wall portion 224. FIG. 14 also shows that fans 248*a-e* (also shown in FIG. 14 as item 248) are mounted or otherwise coupled to the end wall portion 224. While FIG. 14 shows that there are five of each of the fans 232*a-e* and 248*a-e*, it will be apparent that more or fewer such fans may be present.

It will be apparent that additional fans may be provided in the module 200. For example, a fan 270 (FIG. 11) may be provided to force air through the shutter 238. The fan 270 may be turned on when the shutter 238 is open. Similarly, a fan 272 (FIG. 11) may be provided to force air through the shutter 242. The fan 272 may be turned on when the shutter 242 is open.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A modular environmental control system for an enclosed structure, comprising:
   a first air chamber having one or more first openings configured to receive air from an enclosed structure and one or more second openings configured to receive ambient air, the one or more second openings being selectively closable;
   a first duct configured to deliver air from the enclosed structure to the first chamber via the one or more first openings in the first air chamber;
   a second air chamber coupled to receive air from the first air chamber and having one or more openings configured to deliver air to the enclosed structure;
   a divider positioned between the first air chamber and second air chamber, the divider configured to removably mount a plurality of air conditioning modules, wherein air from the first chamber is selectively received into the second air chamber by passing through the air conditioning modules; and
   a second duct configured to deliver air from the one or more openings of the second chamber to the enclosed structure wherein at least a portion of the second duct is positioned outside of the enclosed structure.

2. The modular environmental control system according to claim 1, wherein the divider comprises one or more selectively closable openings that are configured to direct air to bypass the air conditioning modules when in an open position and wherein air received into the second air chamber from the first chamber passes through the air conditioning modules when the one or more selectively closable openings of the divider are in a closed position.

3. The modular environmental control system according to claim 1, the second air chamber having one or more selectively closable openings configured to receive air from the enclosed structure when in an open position.

4. The modular environmental control system according to claim 1, wherein each air conditioning module consists of one or more of the following: an air cooler; an air heater and an air filter.

5. The modular environmental control system according to claim 1, wherein a number of air conditioning modules mounted to the divider is selectable according to a desired environmental control capacity for the system.

6. The modular environmental control system according to claim 1, wherein the first and second air chambers are modularly expansible according to a desired environmental control capacity for the system.

7. The modular environmental control system according to claim 6, wherein the first and second air chambers are modularly expansible by extending their length or by coupling additional air chambers lengthwise.

8. The modular environmental control system according to claim 1, further comprising fluid conduits coupled to the dividing wall for carrying heated or cooled water for the air conditioning modules.

9. The modular environmental control system according to claim 8, wherein the fluid conduits are expansible in length thereby increasing a number of air conditioning modules to which the fluid conduits carry heated or cooled water.

10. The modular environmental control system according to claim 9, wherein one or more chillers or boilers provide cooled or heated water to the fluid conduits according to a desired environmental control capacity for the system.

11. The modular environmental control system according to claim 1, further comprising electrical conduits coupled to the dividing wall for providing electrical power to the air conditioning modules.

12. The modular environmental control system according to claim 1, further comprising gas delivery conduits for delivering gas into the first or second air chambers.

13. The modular environmental control system according to claim 1, further comprising fluid delivery conduits for controlling humidity by delivering water mist to the first or second air chambers.

14. The modular environmental control system according to claim 1, further comprising evaporative cooling modules configured to receive ambient air prior to the ambient air entering the first chamber.

15. The modular environmental control system according to claim 1, further comprising insect screening configured to receive ambient air prior to the ambient air entering the first chamber.

16. The modular environmental control system according to claim 1, further comprising a plurality of fans for drawing air into the enclosed structure from the second air chamber.

17. The modular environmental control system according to claim 1, wherein the first and second air chambers are each sufficiently large to permit entry of personnel for configuring and maintaining the system.

18. A modular environmental control system for an enclosed structure, comprising:
a first air chamber having one or more first openings configured to receive air from an enclosed structure and one or more second openings configured to receive ambient air, the one or more second openings being selectively closable;
a first duct configured to deliver air from the enclosed structure to the first chamber via the one or more first openings in the first air chamber;
a second air chamber coupled to receive air from the first air chamber and having one or more openings configured to deliver air to the enclosed structure;
a divider positioned between the first air chamber and second air chamber, the divider configured to removably mount a plurality of air conditioning modules, wherein air received into the second air chamber from the first chamber passes through openings in the divider and wherein the openings are closable to direct the air through the air conditioning modules and to direct the air to bypass the air conditioning modules; and
a second duct configured to deliver air from the one or more openings of the second chamber to the enclosed structure wherein at least a portion of the second duct is positioned outside of the enclosed structure.

19. A modular environmental control system for an enclosed structure, comprising:
a first air chamber having one or more first openings configured to receive air from an enclosed structure and one or more second openings configured to receive ambient air, the one or more second openings being selectively closable;
a first duct configured to deliver air from the enclosed structure to the first chamber via the one or more first openings in the first air chamber;
a second air chamber coupled to receive air from the first air chamber and having one or more openings configured to deliver air to the enclosed structure and the second air chamber having one or more selectively closable openings configured to receive air from the enclosed structure when in an open position;
a divider positioned between the first air chamber and second air chamber, the divider configured to removably mount a plurality of air conditioning modules, wherein air from the first chamber is selectively received into the second air chamber by passing through the air conditioning modules; and
a second duct configured to deliver air from the one or more openings of the second chamber to the enclosed structure wherein at least a portion of the second duct is positioned outside of the enclosed structure.

20. The modular environmental control system according to claim 18, wherein each air conditioning module consists of one or more of the following: an air cooler; an air heater and an air filter.

21. The modular environmental control system according to claim 18, wherein a number of air conditioning modules mounted to the divider is selectable according to a desired environmental control capacity for the system.

22. The modular environmental control system according to claim 18, wherein the first and second air chambers are modularly expansible according to a desired environmental control capacity for the system.

23. The modular environmental control system according to claim 18, further comprising fluid conduits coupled to the dividing wall for carrying heated or cooled water for the air conditioning modules.

24. The modular environmental control system according to claim 18, further comprising a plurality of fans for drawing air into the enclosed structure from the second air chamber.

25. The modular environmental control system according to claim 18, wherein the first and second air chambers are each sufficiently large to permit entry of personnel for configuring and maintaining the system.

26. The modular environmental control system according to claim 19, wherein each air conditioning module consists of one or more of the following: an air cooler; an air heater and an air filter.

27. The modular environmental control system according to claim 19, wherein a number of air conditioning modules mounted to the divider is selectable according to a desired environmental control capacity for the system.

28. The modular environmental control system according to claim 19, wherein the first and second air chambers are modularly expansible according to a desired environmental control capacity for the system.

29. The modular environmental control system according to claim 19, further comprising fluid conduits coupled to the dividing wall for carrying heated or cooled water for the air conditioning modules.

30. The modular environmental control system according to claim 19, further comprising a plurality of fans for drawing air into the enclosed structure from the second air chamber.

31. The modular environmental control system according to claim 19, wherein the first and second air chambers are each sufficiently large to permit entry of personnel for configuring and maintaining the system.

* * * * *